United States Patent [19]
Law

[11] Patent Number: 5,112,144
[45] Date of Patent: May 12, 1992

[54] ELEVATED TEMPERATURE ELASTOMERIC BEARING

[75] Inventor: Thomas R. Law, Edinboro, Pa.

[73] Assignee: Lord Corporation, Erie, Pa.

[21] Appl. No.: 647,095

[22] Filed: Jan. 29, 1991

[51] Int. Cl.$^5$ .................. F16C 27/06; B64D 27/26; B60G 11/22
[52] U.S. Cl. .................... 384/215; 244/54; 248/557; 267/282; 267/141.1; 384/222
[58] Field of Search ............... 384/215, 220, 221, 222; 244/54; 248/554–557; 267/281, 282, 141.1, 140.4

[56] References Cited

U.S. PATENT DOCUMENTS

| | | | |
|---|---|---|---|
| 3,429,622 | 2/1969 | Lee et al. | 267/141.1 X |
| 4,007,924 | 2/1977 | Jorn et al. | 267/282 |
| 4,286,827 | 9/1981 | Peterson et al. | 384/221 |
| 4,765,758 | 8/1988 | O'Donnell et al. | 384/222 X |
| 4,805,851 | 2/1989 | Herbst | 244/54 |

Primary Examiner—Thomas R. Hannon
Attorney, Agent, or Firm—Richard K. Thomson; James W. Wright

[57] ABSTRACT

An elastomeric bearing for use at elevated temperatures. The elastomeric bearing is particularly suited for use as an aircraft engine mount to isolate the aircraft cabin from engine noises. The bearing assembly incorporates fulcrums at selected locations to provide clearances which accommodate thermal expansion and contraction of the elastomeric layers.

20 Claims, 5 Drawing Sheets

ELEVATED TEMPERATURE ELASTOMERIC BEARING

FIELD OF THE INVENTION

The present invention relates to elastomeric bearings, and more particularly it relates to an improved elastomeric bearing particularly suited for use in high temperature environments such as engine mounts.

BACKGROUND OF THE INVENTION

In certain types of aircraft, turbine engines are mounted to pylons depending from the aircraft wings. Generally, fore and aft mounting bracket assemblies and auxiliary structures connect the engine to the pylon in a manner that accommodates a variety of engine mounting requirements, such as thrust reaction, torque reaction and a variety of static and dynamic loading conditions. The mounting brackets also encounter severe operating conditions, especially vibrations and high temperatures in the case of the aft brackets. An example of a desirable aft turbine engine mounting bracket is disclosed in U.S. Pat. No. 4,805,851 issued on Feb. 21, 1989 to Herbst and owned by the assignee of the present application.

To accommodate the vibrations so as to isolate the aircraft cabin from the engine noise, there is provided in the Herbst mounting bracket an elastomeric bearing assembly. Such a bearing assembly comprises a laminated structure including layers of elastomeric material alternating with shims of metal at predetermined locations. The laminate extends horizontally along a torque tube and is held by a rigid cap fastened to a base plate which, in turn, is mounted to the underside of the wing pylon. A pair of engine mounting arms extend horizontally in spaced parallel relation from opposite ends of the torque tube for connection to an engine hanger. The upper horizontal metal member of the laminate is in contact with the base, and the lower horizontal metal member of the laminate is in contact with the casing. The elastomeric layers are generally pre-compressed. Thus, as the bearing assembly heats up in use, stresses build-up in the elastomeric layers. With wide temperature variations, sizable stresses develop, resulting in reduced life, ruptures, looseness and excessive drift. This necessitates overhaul and replacement of the bearing.

OBJECTS OF THE INVENTION

With the foregoing in mind, a primary object of the invention is to provide a novel elastomeric bearing particularly suited for use at elevated temperatures.

Another object of the present invention is to provide an improved elastomeric bearing of the type described in which the elastomeric and metal layers in the laminate maintain their snug fit over a wide temperature range without the buildup of sizeable stresses so that the bearing will have a materially longer life than has been the case heretofore with such bearings where high temperatures are encountered.

A further object of the invention is to provide an elastomeric bearing for a noise-isolating engine mounting bracket assembly wherein even at elevated temperatures improved performance is obtained relative to elastomeric bearings currently available.

SUMMARY OF THE INVENTION

More specifically, the present invention provides an elastomeric bearing assembly particularly suited for high temperature applications, such as encountered in engine mounts. The bearing comprises a load member having opposite sides extending transversely to a direction of load application, a support member or casing disposed outward of the opposite sides of the load member, at least one elastomeric layer disposed between both of the opposite sides of the load member and the support member, and fulcrum means disposed between the elastomeric layer and at least one of the members for providing clearance adjacent the one member to accommodate expansion of the elastomeric layer in the load direction in response to heating of the bearing assembly, whereby undesirable stress build-ups in the bearing can be avoided. In some illustrated embodiments, the fulcrum means includes a pair of fulcrums spaced apart with a clearance therebetween. In some other illustrated embodiments, the fulcrum means includes a central fulcrum and a pair of clearances on opposite sides of the fulcrum.

BRIEF DESCRIPTION OF THE DRAWINGS

The foregoing and other objects, features and advantages of the present invention should become apparent from the following description when taken in conjunction with the accompanying drawings, in which.

DESCRIPTION OF THE PREFERRED EMBODIMENTS

Figure 1:
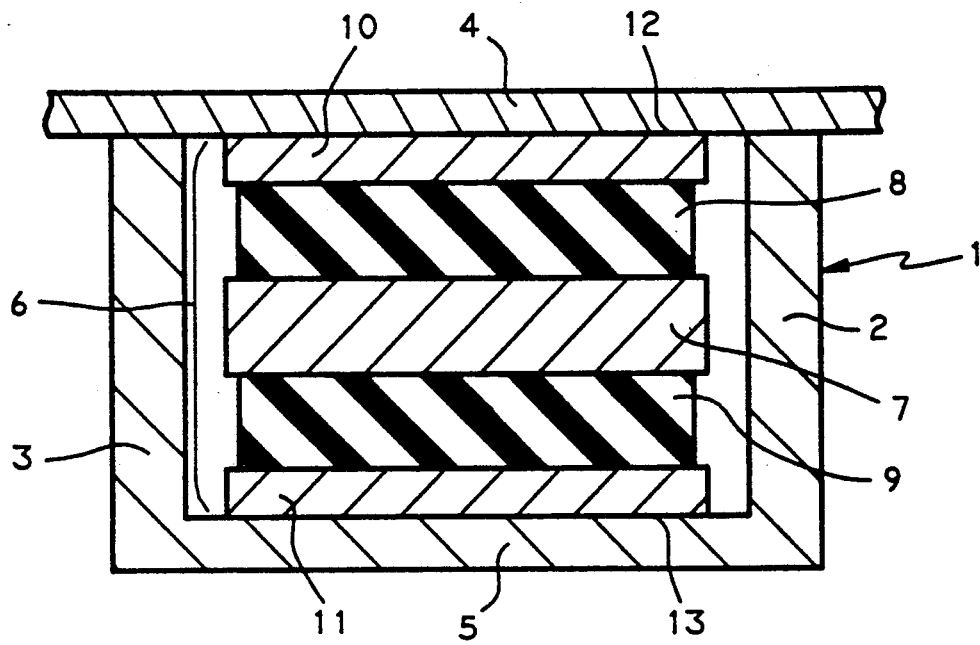
FIG. 1 is a greatly-simplified transverse cross-sectional view of a conventional elastomeric bearing shown at room temperature.

Referring now to the drawings, FIG. 1 illustrates in transverse greatly-simplified cross section, a typical conventional prior art elastomeric bearing usable, for example, in an engine mounting bracket. The bearing includes a casing, or housing, 1 of rigid, or stiff, material, such as metal. The casing 1 comprises fore and aft walls 2 and 3, a top wall support member, or base, 4 and a bottom wall support member, or cap, 5. The casing holds an inner laminate structure 6 comprising an inner metal load member 7, and elastomeric layers 8 and 9 and bearing plates 10 and 11, respectively. The upper surface 12 of the upper bearing plate 10 of the inner laminate structure 8 is adjacent to and in contact with top wall support member 4, and the lower surface 13 of the lower bearing plate 11 is adjacent to and in contact with bottom wall support member 5. The inner metal load member 7 may, and preferably does, extend laterally (perpendicular to the plane of the sheet) beyond the corresponding lateral extent of the fore and aft walls 2 and 3, and thereat mounts arms, or other means, for connecting the load member 7 to an object such as an engine hanger. For a more detailed illustration of such type structure, reference is made to Herbst U.S. Pat. No. 4,805,851, and particularly FIGS. 4 and 5 and related discussion, the disclosure of which is incorporated by reference herein.

Figure 6:
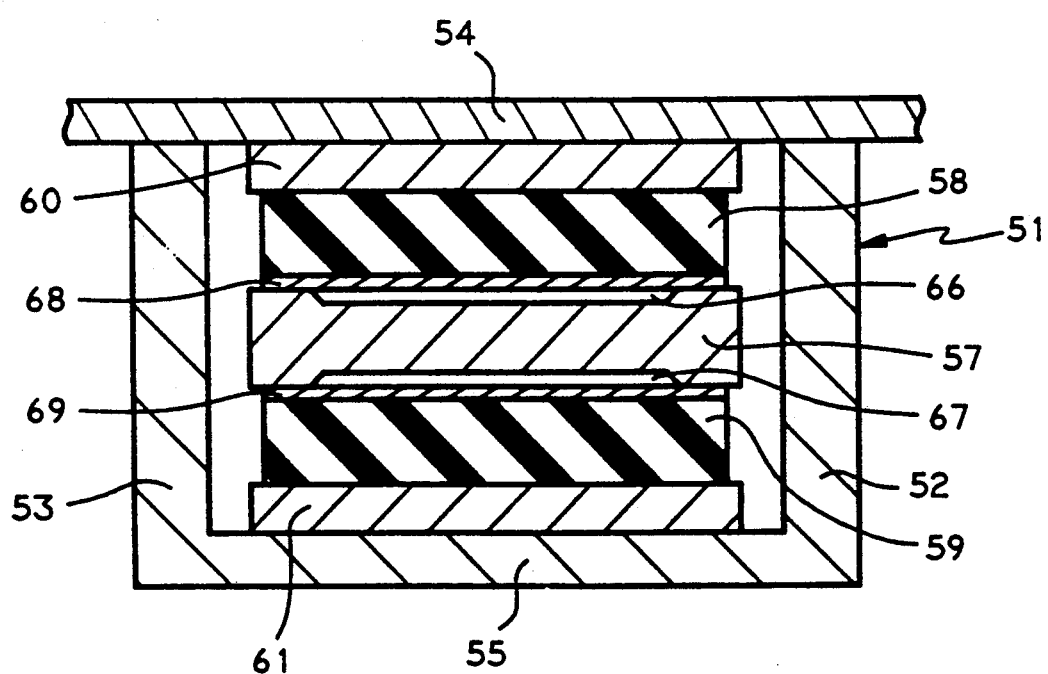
FIG. 6 is a greatly-simplified transverse cross-sectional view of still another embodiment of the invention at room temperature.

Although greatly simplified for purposes of discussing the theory of operation of the present invention, the casing, or housing, 1 may be regarded as corresponding to the assembled cap 48 and base plate 13a in the Herbst patent, the upper and lower plates 10 and 11 corresponding to the members 40 and 41 therein, respectively, the load member 7 corresponding to the torque tube 22 therein, and the elastomeric layers 8 and 9 corresponding to the elastomeric layers and shims 27, 28, 29, 30, 31 and 32, 33, 34, 35, 36 therein respectively. In other words, the simplified crosssectional views of FIGS. 1 and 2 may be viewed as if taken on vertical line C in a structure such as shown in FIG. 6 of the Herbst patent.

Figure 2:
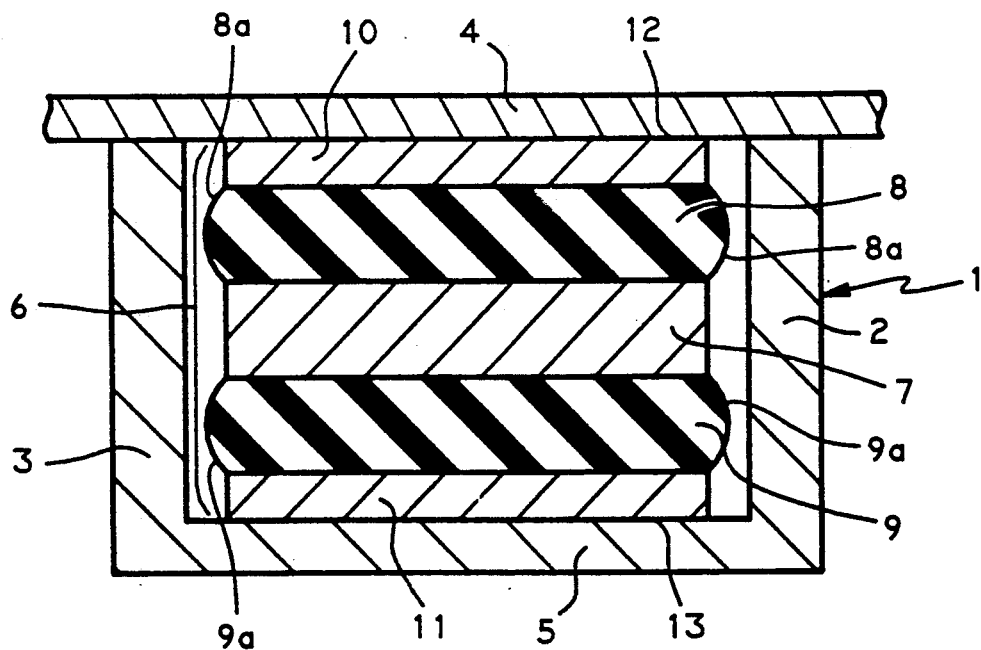
FIG. 2 is a like transverse cross-sectional view of the elastomeric bearing of FIG. 1 but an elevated temperature.

In this application, FIG. 1 represents the bearing at room, or ambient, temperature at which the members of the laminate are in snug, as-constructed, fit, without significant external stress on them but with whatever pre-compression may be required by design, particularly in the elastomeric layers. FIG. 2, however, illustrates the same assembly as in FIG. 1 but at elevated temperatures occasioned, for example, during operation of a turbine engine connected to the load member 7. At such temperatures, the elastomeric layers 8 and 9, each of which has a coefficient of thermal expansion greater than the sum of those of the casing 1, metal plates 10 and 11, and the inner metal load support 7, expands in the vertical direction, i.e. the direction of major loading. Because of the stiffness of the metal casing 1, such expansion is accommodated to some extent by bulges formed at the unconfined edges 8a and 9a. Unaccommodated expansion causes high stress to develop in the elastomeric layers, and repeated expansion and contraction, between times of operation and down times, causes loosening or gapping between the upper surface 12 and lower surface 13 with housing 1 and possible rupturing of the elastomeric outer edges 8a and 9a.

Figure 3:
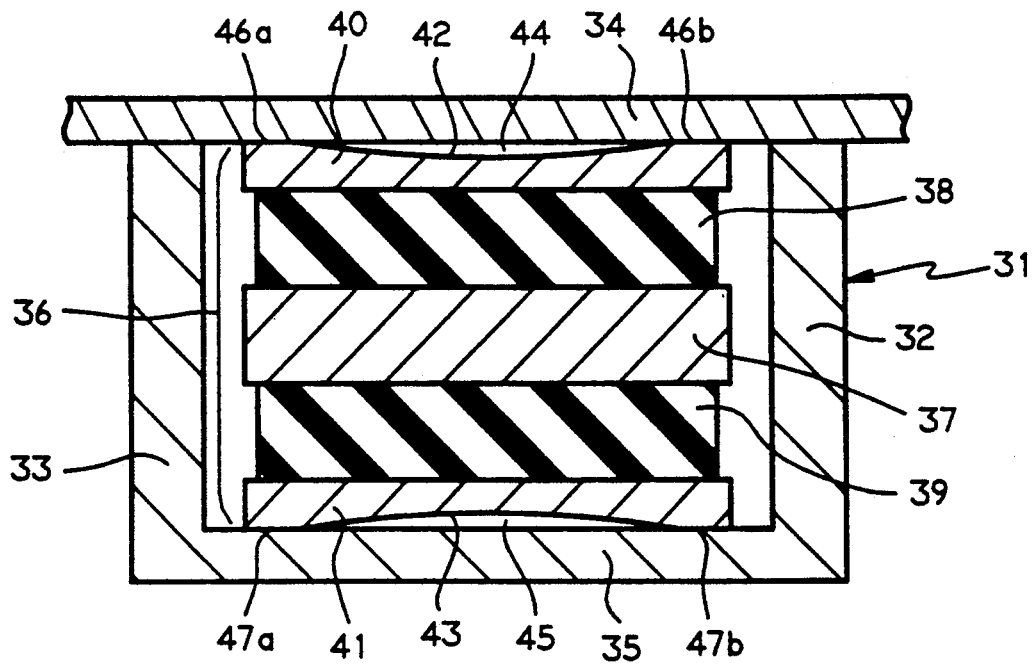
FIG. 3 is a greatly-simplified transverse cross-sectional view of one embodiment of an elastomeric bearing of the present invention at room temperature.

The present invention overcomes the aforementioned limitations of known bearings and provides an elastomeric bearing which has desirable operational and maintenance characteristics even when used in environments involving elevated ambient temperatures, such as aircraft engine mounts. To this end, FIG. 3 illustrates an elastomeric bearing of the present invention, which is similar in many respects to that shown in FIG. 1, except for the significant differences discussed below. Thus, the bearing has a casing 31 of rigid, or stiff, material such as metal. The casing 31 comprises fore and aft walls 32 and 33, top support member wall 34 and bottom support member wall 35. The casing holds an inner laminate structure 36 comprising inner metal load member 37, elastomeric layers 38 and 39 and terminal plates of metal 40 and 41. As discussed above, the inner metal load member 37 may be suitably shaped and may have arms at opposite ends for connection to an engine hanger, as in the Herbst patent.

In accordance with the present invention, however, concave surfaces 42 and 43, are provided on the upper and lower plates 40 and 41, respectively over at least a portion of the outermost faces of the plates 40 and 41. These concave surfaces form an upper pair of fulcrums 46a and 46b and a lower pair of fulcrums 47a, 47b, both of which are spaced apart fore and aft and laterally in the direction of load application (i.e. vertical). The concave surfaces 42 and 43 form relatively small clearances 44 and 45 (several thousandth's of an inch being sufficient) which allow the metal bearing plates 40 and 41, respectively, to flex toward the walls 34 and 35, respectively, by forces exerted on the plates due to thermal expansion of elastomeric layers, 38 and 39, respectively.

Figure 4:
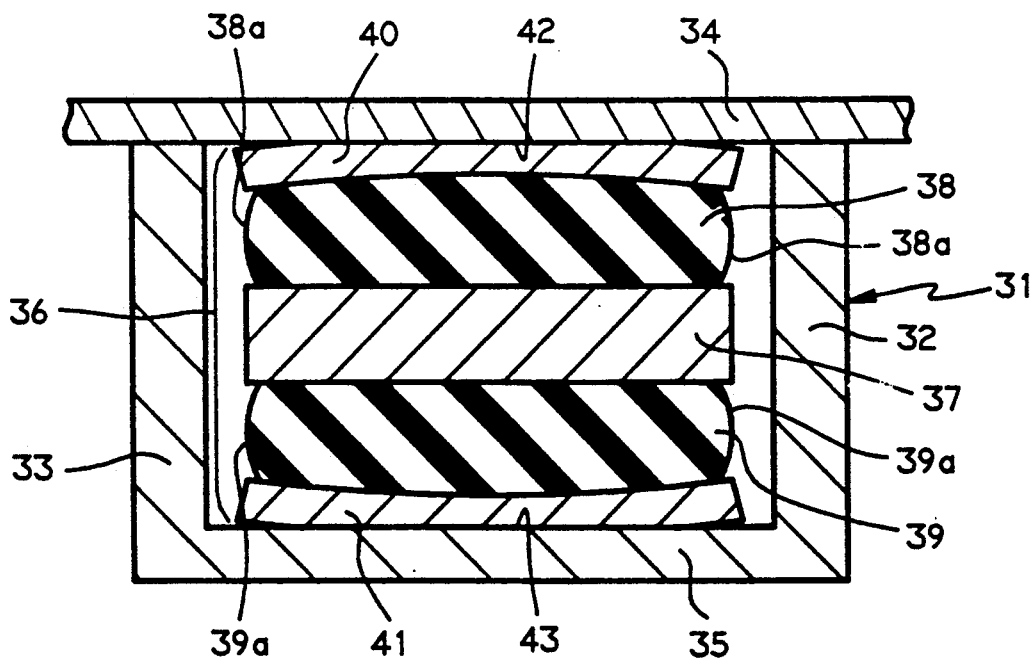
FIG. 4 is like transverse cross-sectional view of the elastomeric bearing of FIG. 3 at an elevated temperature.

This flexure is illustrated in FIG. 4 wherein like numerals represent like members as in FIG. 3. FIG. 4, however, illustrates the configuration of the members at elevated temperatures encountered for example during operation of an engine connected to the bearing. In this view, thermally expanding elastomeric members 38 and 39 (which have coefficients of thermal expansion greater than that of the casing 31 and the summation of their adjacent metal layers 40 and 41, respectively, and inner metal member 37) force metal bearing plates 40 and 41 to flex toward walls 34 and 35, respectively. The elastomeric members 38 and 39 are thus allowed to expand in a direction other than toward the ends 38a and 39a, namely, in a direction normal to their planes in the laminate structure. This markedly reduces the bulges at their ends and reduces stresses within the elastomeric material. As a result, any bonds which exist are not weakened or fatigued during expansion/contraction cycles, and the outer edges of the elastomeric members 38 and 39 do not rupture.

Figure 5:
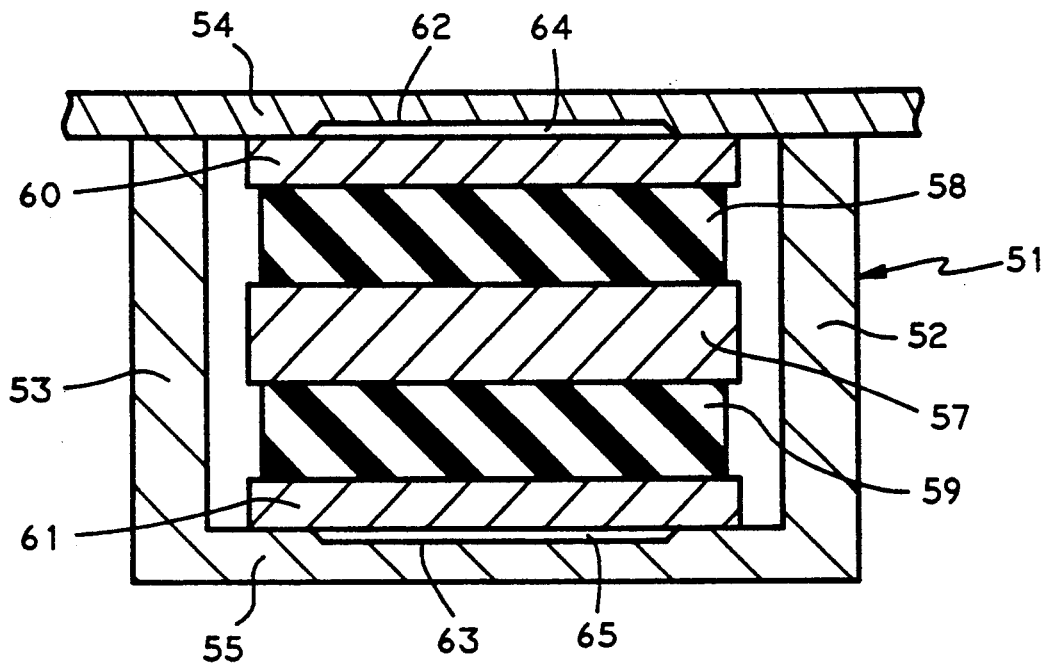
FIG. 5 is a greatly-simplified transverse cross-sectional view of another embodiment of the present invention at room temperature.

FIG. 5 illustrates an embodiment similar to that shown in FIGS. 3 and 4, but wherein the fulcrums are formed integral with the inner faces of the upper and lower walls of the casing 51. The casing has fore and aft walls 52 and 53, confining top support wall member 54 and confining bottom support wall member 55. The casing holds an inner laminate structure comprising an inner metal load member 57, elastomeric layers 58 and 59, and metal bearing plates 60 and 61. As shown in FIG. 5 there are, in accordance with this embodiment of the invention, a pair of concave surfaces 62 and 63, which provide a pair of spaced fulcrums and clearances 64 and 65 respectively, over at least a portion of the inner face of the top support wall member 54 and of the inner face of the bottom support wall member 55, respectively. The clearances allow the metal bearing plates 60 and 61, respectively, to flex toward confining walls 54 and 55, respectively, by forces exerted on the members due to thermal expansion of the elastomeric layers 58 and 59.

FIG. 6 illustrates an embodiment wherein the fulcrums and their associated clearances are provided in both faces of the inner metal member 57 and relatively thin metal bearing shims are disposed between the adjacent elastomeric layers 58 and 59 and inner metal load member 57 to provide the desired flexing. Reference numerals 66 and 67 indicate the clearances, and reference numerals 68 and 69 indicate the metal bearing shims. In FIG. 6 like numbers refer to like members as described in connection with FIG. 5. In this embodiment, thermal expansion of the elastomeric layers causes the bearing shims 68 and 69 respectively, to flex, into the clearances 66 and 67, respectively due to the fulcrums provided at opposite ends of the inner load member 57.

Figure 7:
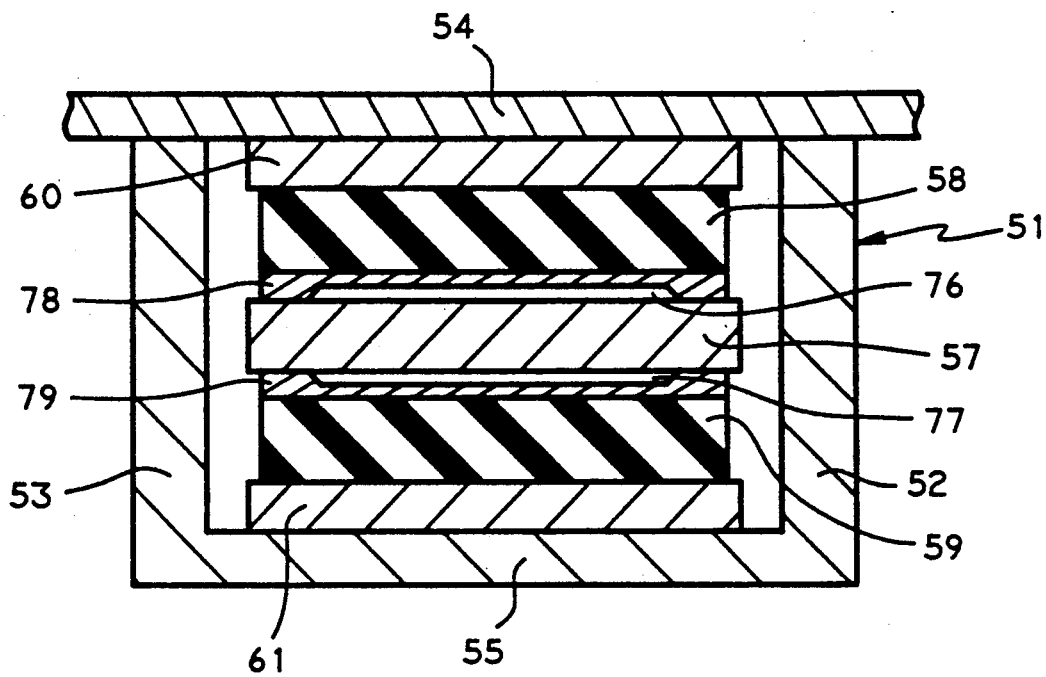
FIG. 7 is a greatly-simplified cross-sectional view of yet another embodiment of the present invention at room temperature.

FIG. 7 illustrates an embodiment similar to that shown in FIG. 6 wherein, however, the faces of the metal bearing shims 78 and 79 adjacent inner metal member 57 are recessed to provide the clearances 76 and 77. In FIG. 7 like numbers refer to like members as described in connection with FIGS. 5 and 6. In this embodiment, however, thermal expansion of the elastomeric layers causes the bearing shims 78 and 79, respectively, to flex into the clearances 76 and 77, respectively.

Figure 8:
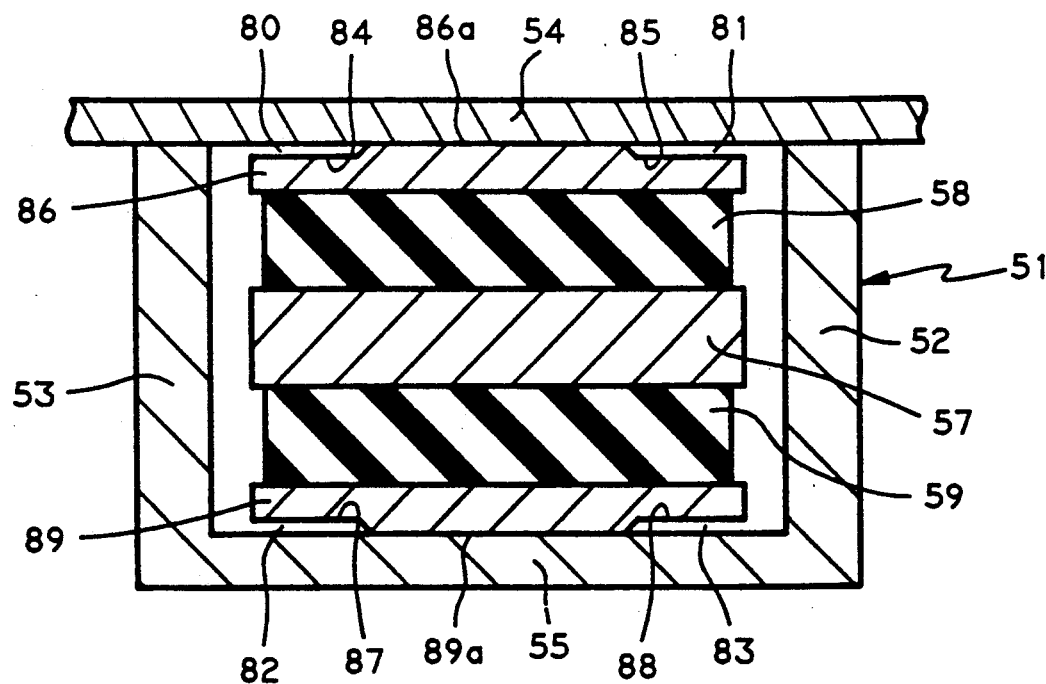
FIG. 8 is a greatly-simplified transverse crosssectional view of a further embodiment of the present invention at room temperature.

FIG. 8 illustrates an embodiment somewhat similar to that shown in FIGS. 3 and 4 wherein, however, the fulcrums are provided centrally and the clearances along the sides of the metal bearing plates instead of the clearance being in the central portion as in FIGS. 3 and 5. In this embodiment, concave surfaces 84 and 85 are provided along the marginal portions of the top metal bearing member 86 to form a central fulcrum 86a, and concave surfaces 87 and 88, respectively are provided, along the marginal portions of bottom bearing member 89 likewise to form a central fulcrum 89a. Clearances 80, 81, 82 and 83 are provided on opposite sides of the fulcrums 86a and 89a, respectively. Otherwise, like numbers refer to like members as described in connection with FIGS. 5, 6 and 7. In this embodiment, thermal expansion of the elastomeric layers causes the metal bearing plate 86 to flex into the clearances 80 and 81, and the metal bearing plate 89 to flex into the clearances 82 and 83.

Figure 9:
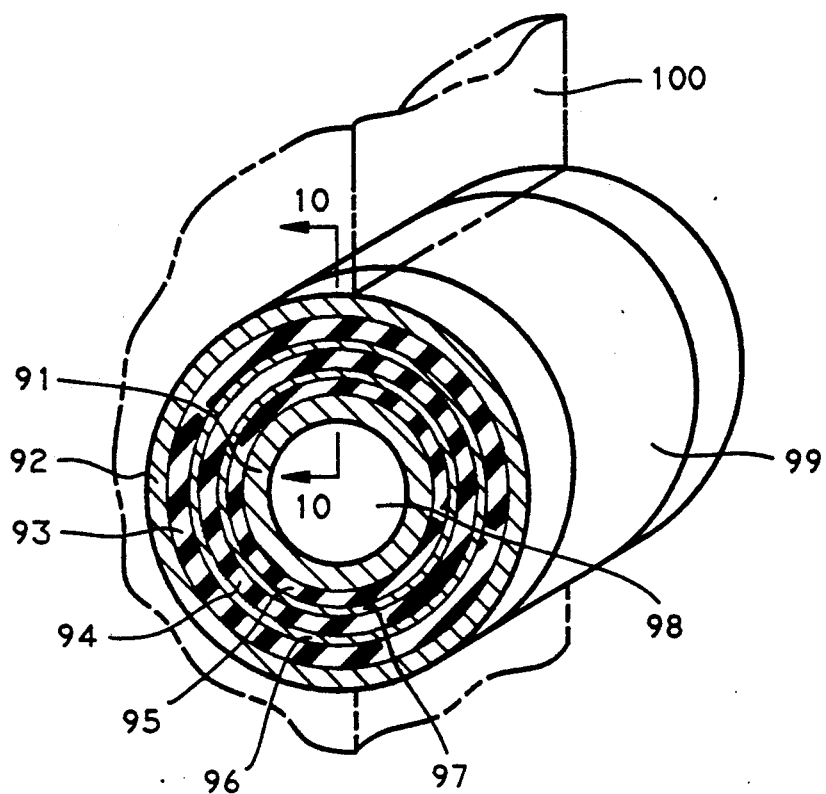
FIG. 9 is a greatly-simplified perspective view in partial cross-section of a tube-form embodiment of the invention at room temperature.
Figure 10:
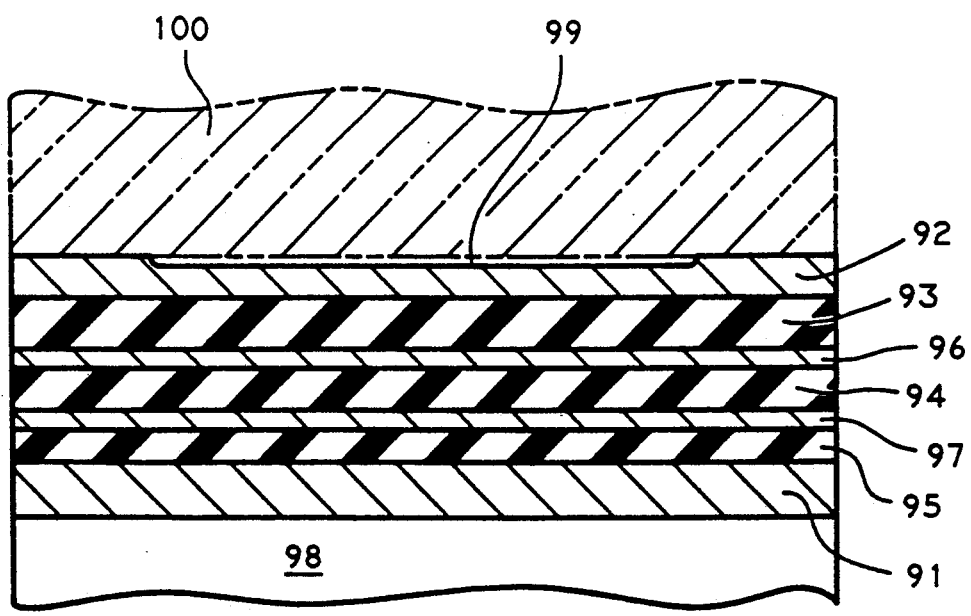
FIG. 10 is a vertical longitudinal view taken on lines 10—10 at FIG. 9 with associated structure shown in phantom lines.

FIG. 9 illustrates an embodiment of the invention which is tubular in configuration. In this embodiment, the inner metal load member is in the form of an inner tube 91, and the metal support member 92 is also in the form of an outer tube which surrounds the tube 91. Reference numerals 93, 94 and 95 identify tubular elastomeric layers, and reference numerals 96 and 97 identify relatively thin metal shims separating the elastomeric layers 93, 94 and 95. A hollow bore 98 of the assembly is provided for attachment to a load bearing pin. A recess 99 is provided in the circumference of the outer support member 92 in the region where it is surrounded by a stiff collar structure 100 shown in phantom in FIG. 10 which is a vertical longitudinal view in section taken in the direction of arrows 10—10. In this embodiment, thermal expansion of elastomeric layers 93, 94 and 95 causes flexing of the thin metal shims 96 and 97, and ultimately displaces the metal member 92 into the clearance 99 in a manner described heretofore with like results. Although the flexing has been shown as being accommodated by the outer support member 92, it will be understood that the flexing can be accommodated on inner member 91 or in a manner similar to the cases illustrated in FIGS. 5, 6, 7 or 8, but having a cylindrical configuration.

While the invention has been illustrated and described in terms of one inner, load-carrying member, two elastomeric layers on opposite sides of it, and two outer metal support plates which confine the laminate, as making up the inner laminate structure, it should be understood that load-carrying members of other materials and shapes and configurations may be used with a corresponding variation in the number of elastomeric layers to accommodate them. Thus, more than two elastomeric layers may be used with one load-carrying metal member, with additional non-load-carrying metal shims being employed. In addition, the flexing can be accommodated on inner member 91 or similar to cases illustrated in FIGS. 5, 6, 7, 8 but in a circular form.

The elastomeric layers may be adhesively bonded to the metal members. However, bonding of some or all of the junctures between members may not be necessary in some cases. For example, in the embodiment shown in FIGS. 3 and 4, bearing plates 40 and 41 are generally not bonded to top and bottom support members 34 and 35, respectively, but could be, and elastomeric layers 38 and 39 are generally bonded to adjacent metal members 37, 39 and 40, but need not be. Although the invention has been described in terms of high temperature application, it will be understood that the bearing of the present invention may alternatively be designed and used for low temperature application. For example, the bearing 31 could be precompressed at room temperature to the FIG. 4 configuration and, in low temperature application for which it was designed, would be configured as shown in FIG. 3. Obviously, such a bearing could not be used simultaneously in both high and low temperature applications but must be designed and used in one application or the other.

The elastomeric material utilized is of the high temperature type, known to those skilled in the art of designing elastomeric bearings. The layers to be adhesively bonded, or not bonded, are also known. The type metal used in the metal plates intended to be flexed is selected with that property in mind.

While particular embodiments of the invention have been illustrated and described herein, it is not intended so to limit the invention, and changes and modification may be made therein within the scope of the following claims.

I claim:

1. In an elastomeric bearing assembly particularly suited for use in high or low temperature environments, the bearing including a load member having opposite sides extending transversely to a direction of load application, a support member disposed outward of said opposite sides, and at least one elastomeric layer disposed between said opposite sides of said load member and said support member, the improvement comprising fulcrum means disposed between said elastomeric layer and at least one of said members for providing clearance adjacent said one member to accommodate expansion of the elastomeric layer in said load direction in response to heating of the bearing assembly, whereby undesirable stress build-ups in the bearing are avoided.

2. The bearing assembly according to claim 1 wherein said fulcrum means includes a pair of fulcrums spaced apart laterally of said direction and a clearance therebetween.

3. The bearing assembly according to claim 1 wherein said fulcrum means includes a fulcrum and a pair of clearances on opposite sides of the fulcrum.

4. The bearing assembly according the claim 1 wherein said fulcrum is formed integral with said support member.

5. The bearing assembly according to claim 1 wherein said fulcrum means is formed integral with said load member.

6. The bearing assembly according to claim 1 wherein said fulcrum means is formed on a plate interposed between said elastomeric layer and said one member.

7. The bearing assembly according to claim 1 wherein said support member includes a pair of stiff metal structures connected together in fixed spaced apart dimensional relation in the direction of load application, and said fulcrum means includes a pair of fulcrums located between said stiff metal structures.

8. The bearing assembly according to claim 7 wherein at least one of said pair of fulcrums includes a flexure plate engaged between said elastomeric layer and one of the said metal structures.

9. The bearing assembly according to claim 1 wherein said fulcrum means is formed integral with one of said members and including a flexure plate engaged between said fulcrum means and its associated elastomeric layer.

10. An elastomeric bearing assembly for use in high temperature environments, comprising:
   a load member adapted to be connected to a load, said load member having opposite side surfaces extending transverse to a direction of loading;
   a support member disposed outward of said opposite side surfaces of said load member in confronting relation therewith;
   at least one elastomeric layer disposed between said opposite side surfaces of said load member and said support member; and
   means providing at least one fulcrum between said elastomeric layer and at least one of said members, said fulcrum providing means having one surface engaged with said elastomeric layer and another surface opposite said one surface in spaced confronting relation with its associated one of the members to provide a clearance therebetween,
whereby an increase in temperature of the bearing assembly which causes the elastomeric layer to expand in the direction of load application is accommodated by flexure of the fulcrum providing means into the clearance 11. The elastomeric bearing assembly according to claim 10 wherein said fulcrum providing means includes at least one plate having a central recess providing a pair of fulcrums spaced laterally of said clearance.

12. The elastomeric bearing assembly according to claim 10 wherein said fulcrum providing means includes at least one plate having a central fulcrum and a pair of recesses on opposite sides thereof providing said clearance.

13. The bearing assembly according to claim 10 wherein said clearance is provided adjacent to said load member.

14. The bearing assembly according to claim 10 where said clearance is provided adjacent to said support member.

15. The bearing assembly according to claim 10 wherein said fulcrum means is formed integral with at least one of said members.

16. A laminated elastomeric bearing assembly for mounting an engine to an aircraft, the bearing assembly including a load support member, a frame member, and alternating layers of elastomeric material and shims disposed between said members, said bearing assembly being subjected to engine heat which causes the elastomeric layers to expand in a load direction, the improvement comprising: means providing at least one fulcrum defining a clearance between at least one of said elastomeric layers and at least one of said members for enabling said elastomeric layer to expand in said load direction in response to an increase in temperature, whereby thermally-induced stresses in the elastomeric layers are minimized.

17. A laminated elastomeric bearing according to claim 16 where said fulcrum means includes a pair of fulcrums disposed laterally of said load direction with said clearance therebetween.

18. A laminated elastomeric bearing according to claim 16 wherein said fulcrum means includes a single fulcrum and a pair of clearances located laterally thereof.

19. A laminated elastomeric bearing according to claim 16 wherein said fulcrum means is formed integral with one of said members and including a flexure plate interposed between said fulcrum means and its adjacent elastomeric layer.

20. A laminated elastomeric bearing according to claim 16 wherein said support member surrounds said alternating layers and said load member includes a tube extending through said support member.

* * * * *